United States Patent
Miyano Neto et al.

(10) Patent No.: US 12,045,838 B2
(45) Date of Patent: Jul. 23, 2024

(54) SYSTEM AND METHOD OF IDENTIFICATION AND AUTHENTICATION FOR TRACING AGRICULTURAL ASSETS, IDENTIFICATION ELEMENT FOR SECURE IDENTIFICATION OF AGRICULTURAL ASSETS AND CORRESPONDING COMPUTER PROGRAMS

(71) Applicant: SICPA HOLDING SA, Prilly (CH)

(72) Inventors: Roberto Miyano Neto, Rio de Janeiro (BR); Marcos Ponte Soares, Pully (CH)

(73) Assignee: SICPA HOLDING SA, Prilly (CH)

( * ) Notice: Subject to any disclaimer, the term of this patent is extended or adjusted under 35 U.S.C. 154(b) by 659 days.

(21) Appl. No.: 16/767,821

(22) PCT Filed: Nov. 14, 2018

(86) PCT No.: PCT/EP2018/081255
§ 371 (c)(1),
(2) Date: May 28, 2020

(87) PCT Pub. No.: WO2019/105739
PCT Pub. Date: Jun. 6, 2019

(65) Prior Publication Data
US 2020/0387913 A1 Dec. 10, 2020

(30) Foreign Application Priority Data

Nov. 28, 2017 (WO) ................ PCT/EP2017/080735

(51) Int. Cl.
| | | |
|---|---|---|
| G06Q 30/018 | (2023.01) | |
| G06F 16/22 | (2019.01) | |
| G06Q 10/08 | (2023.01) | |
| G06Q 50/02 | (2012.01) | |
| G06K 7/14 | (2006.01) | |

(52) U.S. Cl.
CPC ........ *G06Q 30/0185* (2013.01); *G06F 16/22* (2019.01); *G06Q 10/08* (2013.01); *G06Q 50/02* (2013.01); *G06K 7/1417* (2013.01)

(58) Field of Classification Search
None
See application file for complete search history.

(56) References Cited

U.S. PATENT DOCUMENTS

| | | | |
|---|---|---|---|
| 7,062,513 B2* | 6/2006 | Beck ................... | G06Q 10/087 705/37 |
| 7,383,984 B2 | 6/2008 | Silverbrook et al. | |
| 7,761,334 B2* | 7/2010 | Pickett ................ | A01B 79/005 706/904 |
| 7,798,403 B2 | 9/2010 | Tiller et al. | |
| 2004/0158402 A1 | 8/2004 | Sommer | |
| 2013/0041833 A1 | 2/2013 | Paikray et al. | |

FOREIGN PATENT DOCUMENTS

| | | | |
|---|---|---|---|
| EP | 1346622 | 9/2003 | |
| EP | 1346622 A1 * | 9/2003 | .......... A01B 79/005 |
| EP | 1756759 | 2/2007 | |
| JP | 2013230088 | 11/2013 | |

OTHER PUBLICATIONS

Huang-Youwen, "Based on the Supply Chain of Agricultural Products Logistics Operational Risk Assessment and Avoid," 2015 Seventh International Conference on Measuring Technology and Mechatronics Automation, 2015, pp. 246-254, doi: 10.1109/ICMTMA. 2015.67 (Year: 2015).*
Eurasian Office Action in counterpart Eurasian Application No. 202091317 dated Jun. 30, 2021.
International Search Report along with the Written Opinion issued with respect to application No. PCT/EP2018/081255.
Ne tak strashen EGAIS,kak im pugaiut: chem pomozhet unikalnyi modul DataMobile EGAIS roznichnym magazinam, Unified State Automated Information System (USAIS) is not as scary as they are scared: how the unique DataMobile USAIS module will help retail stores, Website—https://habr.com/ru/company/scanport/blog/339518/, retrieved Oct. 26, 2022, 13 pages.
Aktsisnaya Marka na alkogol (Excise stamp for alcohol), Website: https://www.syl.ru/article/309116/aktsiznava-marka-na-alkogol, retrieved Oct. 26, 2022, 11 pages.
Notification of Eurasian Office Action in counterpart Eurasian Patent Application No. 202091317 dated Oct. 26, 2022 (and English language translation of Office Action), 8 pages.

* cited by examiner

*Primary Examiner* — Patricia H Munson
*Assistant Examiner* — Nancy N Prasad
(74) *Attorney, Agent, or Firm* — Muncy, Geissler, Olds & Lowe, P.C.

(57) ABSTRACT

The present invention refers to a system and to a method of identification and authentication for tracing agricultural assets, wherein the agricultural assets are provided with identification elements univocally coded and grouped into rolls, requiring digital activation to be validated. Moreover, the present invention refers to an identification element and to corresponding computer programs.

9 Claims, No Drawings

SYSTEM AND METHOD OF IDENTIFICATION AND AUTHENTICATION FOR TRACING AGRICULTURAL ASSETS, IDENTIFICATION ELEMENT FOR SECURE IDENTIFICATION OF AGRICULTURAL ASSETS AND CORRESPONDING COMPUTER PROGRAMS

FIELD OF INVENTION

The present invention relates to the field of supervisory communication networks and data processing, in particular the tracing of assets by means of digitally activatable identification elements, notably for the tracing and proof of authenticity of agricultural assets.

The present invention refers to a system and to a method of identification and authentication for tracing agricultural assets, to an element for secure identification of agricultural assets and to corresponding computer programs.

BACKGROUND OF THE INVENTION

The voluminous and growing investments of the agricultural sector in the research and development of seeds, cultivars and the like, which are every time more productive and resistant to pests and inclement weather, has given rise to an equally growing parallel market of agricultural assets, which deals from the theft of seeds to the unauthorized genetic manipulation and copy of these elements, including falsification of products and identifiers.

Agricultural assets of clandestine origin infest the crops causing cross-contamination and reducing the productivity, in addition to resulting in a difficult to estimate environmental and public health risk.

On the side of the seed and input industry, piracy appears as a strong investment demotivating element and a disruptor of the production chain.

And finally, another market that suffers from the unauthorized genetic manipulation and copy of agricultural assets is the livestock market, since low quality vegetation and pasture can influence the health of cattle, putting at risk any investment made.

There is a wide variety of solutions for the identification and tracing of agricultural assets in the state of the art, by means of tagged and field-traceable codes by means of portable reading devices, mobile phones with specific applications, computers, scanners and the like.

One example is patent document U.S. Pat. No. 7,761,334, disclosing a method and a system for automated tracing of an agricultural product. Said document discloses that crop information related to a particular crop is collected and stored in data storage during the performance of an agricultural operation. A harvested particular crop is segregated from all other genetically distinct crops by storing the particular harvested crops in one or more segregated storage volumes for storing the particular crop. Each segregated storage volume has a corresponding storage identifier. An electronically accessible data profile, associated with the particular crop, is provided or made available to a user. The data profile includes the collected crop information.

As in other prior art documents, the method and system of patent document U.S. Pat. No. 7,761,334 still exhibit as their main problems the non-provision of greater convenience of access to information for agricultural assets through affordable and everyday use devices (mobile phones, tablets and similar devices); the over-spending of resources by using systems that require adaptations to sowing or harvesting machinery; in addition to failing to provide greater security to the entire chain of producers, retailers and consumers through an element whose falsification and/or breach is difficult and/or costly.

Similarly, other patent documents can be cited such as US 2013/0041833, US 20040158402 and JP 2013230088. In addition to the problems mentioned above, it is also possible to note the existence of systems that aggregate multiple microproducers as a single producer (which can lead to problems with certification of producers, possible falsification or loss of products); association of the product exclusively to a time stamp; in addition to expensive training because the verification or certification of the product depends on a large number of employees and/or members of rural farms.

As can be inferred from the foregoing description, an objective of the present invention is to provide a system for tracing agricultural assets that overcomes the drawbacks of the cited prior art, particularly:

a) Providing security to the entire chain of producers, retailers and consumers;
b) Guaranteeing this security by means of elements whose falsification and/or breach are difficult and/or costly; and
c) Not requiring the producer and the retailer a costly apparatus or a complicated mobilization both in his facilities and in his staff.

Another objective of the present invention is the provision of a method of identification and authentication for tracing agricultural assets to be implemented by means of the system provided by the present invention.

An additional objective of the present invention is the provision of an identification element as part of the system and of the method according to the invention, notably with eight different security levels.

Finally, the present invention aims to provide corresponding computer programs.

DETAILED DESCRIPTION OF THE INVENTION

System

A system according to the invention is a system of identification and authentication for tracing agricultural assets comprising:

1. An agricultural asset to be traced;
2. An identification element;
3. An individual or collective package for the agricultural asset;
4. Eventually a master package for a plurality of agricultural assets;
5. A graphic marking device of the identification element;
6. A material marking device of the identification element;
7. A digital marking device of the identification element;
8. One or more mobile devices;
9. A computer program associated with the mobile device;
10. A remote server; and
11. A computer program associated with the remote server.

In an embodiment, a system according to the invention is a system of identification and authentication for tracing agricultural assets comprising:

a remote server of a service provider comprising a processing unit configured to register agricultural assets chain participants data in a database, to create an identification element endowed with a unique secure code linked to an agricultural assets chain participant and to send the identification element to the requesting agricultural assets chain participant for subsequent digital activation of the identification element through an association, via the remote server, of the unique secure code of the identification element to an origin data of the agricultural asset;

one or more mobile devices configured to read the identification element and to verify an authenticity of the agricultural assets by checking the unique secure code compliance with an information contained in the database of the remote server.

The agricultural asset to be traced means any agricultural product, of collection or extraction, of intensive or extensive planting or cultivation, available in the form of seed, cultivar, fruit, fruitage, flower, vegetable, greenery, grain, powder, fluid, cluster, pod, seedling, plant, root, tuber or any equivalent.

The identification element is an element physically associated with the agricultural asset capable of receiving identification and authentication markings and that will be, after duly marked, unequivocally fixed to the agricultural asset, wherein it should preferably be, but is not limited to, a label.

The individual or collective package is any packaging capable of adequately containing the agricultural asset or a plurality thereof and capable of receiving the identification element associated with it in a visible and easily accessible place. Depending on the type and form of the agricultural asset, the identification element can be fixed directly to the agricultural asset. Depending on the type and form of the agricultural asset, the identification element can be one identification applied directly to the packaging.

The eventually needed master package is a packaging for containing a plurality of individual or collective packages of agricultural assets.

The graphic marking device preferably is, but is not limited to, a device capable of printing any graphic marking to the surface of the identification element. Depending on the type and form of the agricultural asset, the identification element can be a graphic marking applied directly to the packaging.

The material marking device preferably is, but is not limited to, a device capable of printing any material marking to the surface of the identification element. Depending on the type and form of the agricultural asset, the identification element can be a material marking applied directly to the packaging.

The digital marking device preferably is, but is not limited to, a device capable of printing any digital marking to the surface of the identification element. Depending on the type and form of the agricultural asset, the identification element can be a digital marking applied directly to the packaging.

The mobile device is any mobile device such as a mobile telephone or smartphone or tablet device or device of exclusive use or any suitable similar, wherein the term "mobile device" here must be understood as one or more mobile devices capable of collecting information and participating in a network for the transmission of data and/or images and/or audio, including bluetooth, RFID and other applicable forms of communication.

The computer program associated with the mobile device or, simply, application is a program executable by the mobile device, so that each mobile device can serve both as a reader of the identification element and as a communication tool with a remote server.

The remote server is a central server comprising a processing unit and a database and is responsible for managing the system. It may be one or more servers, in a cloud or in specific locations or the like.

The computer program associated with the remote server or, simply, platform, is a program executable by the remote server and responsible for the management of the system as a whole, of the database and of information processing, recording and reading the information of all system components, activation, authentication and traceability of the identification elements.

Method

A method according to the invention is a method of identification and authentication for tracing agricultural assets, executed by a system according to the invention, being applicable to the entire productive chain of agricultural assets, from the provider of the assets, to one or more intermediaries (or retailers) to the final user (or final consumer) of these assets, being administered by an identification, authentication and tracing service provider.

The provider of agricultural assets should be understood as being the one responsible for the research, development, production and distribution of agricultural assets, available in the form of seed, cultivar, fruit, fruitage, flower, vegetable, greenery, grain, powder, fluid, cluster, pod, seedling, plant, root, tuber or any equivalent.

The intermediary or retailer should be understood as being the one responsible for the planting, harvesting, processing and marketing of agricultural assets, for example in the form of resale.

The end user or final consumer should be understood as being the one that effectively makes commercial use of the agricultural asset.

As for the provider of the services of identification, authentication and tracking, hereinafter referred to as the service provider, it is responsible for the management of the entire system according to the invention, coordination of the method according to the invention, controlling the creation of identification elements, the generation of association codes, the provision and updating of the computer programs (application and platform), origin and authenticity of the agricultural asset and its tracing.

A method according to the invention comprises the following method steps:
1. Registration of the value chain participants data in the platform database;
2. Request of an identification element by the intermediary to the service provider;
3. Codification, personalization and confection by the provider of the requested identification elements;
4. Grouping of identification elements in batches or rolls;
5. Sending of identification elements by the provider to the requesting intermediary;
6. Acknowledgment of receipt by the requesting intermediary of the identification elements and updating of the platform;
7. Application of the identification elements by the requesting intermediary to the packaging of agricultural assets;
8. Digital activation by requesting intermediary of the identification element; and
9. Eventual aggregation by the requesting intermediary of the packaging in multiples of packages.

In an embodiment, a method according to the invention comprises the following method steps:
registering agricultural assets chain participants data in a database of a remote server of a service provider;

requesting, by an agricultural assets chain participant, an identification element from the service provider;

codificating, personalizing and creating, by the service provider, the identification element endowed with a unique secure code linked to the agricultural assets chain participant;

sending, by the service provider, the identification element to the agricultural assets chain participant;

applying the identification element, by the agricultural assets chain participant, to the agricultural assets or to the packaging of the agricultural assets;

performing a digital activation of the identification element by the agricultural assets chain participant through an association, via the remote server, of a unique secure code of the identification element to an origin data of the agricultural asset; and reading the identification element and verifying an authenticity of the agricultural assets by checking the unique code compliance with the information contained in the database of the remote server.

The first step of the method according to the invention comprises the registration of the agricultural assets chain participant's data in the database of the remote server, by supplying the usual registration data of both the provider of agricultural assets and the intermediary and possibly one or more final consumers.

The intermediary and even the final consumer can make the request for identification elements to the service provider. In a preferred embodiment of the invention, the identification element is a label.

Having received the request, the service provider moves on to the codification, personalization and creation, in a secure environment, of the requested identification elements, endowed with a unique and secure code (encrypted), comprising a two-dimensional code (for example, a QR CODE), a unique serial number (Human Readable Code or HRC) and a one-dimensional barcode for traceability, all linked to the requesting intermediary.

As for the identification elements in the form of labels, the secure environment may be a secure printer or other printing facility having proven and audited security, controlled and accessed solely and exclusively by the service provider, for the codification, personalization and creation of labels having at least one of three distinct types of security, comprising digital security, graphic security and material security.

Digital security refers to a unique and secure code, represented by three forms to make reading easier, which permits the access to the platform to perform the tracing of the agricultural asset in the distribution chain. The first form is a unique and traceable two-dimensional security code (for example, QR CODE, DATA MATRIX etc.), the second form is a sequential number code readable by the naked eye, and the third form is a logistic code, for example, a barcode or the like, suitable for logistical control.

Graphic security refers to microtext printing on a raised layer that allows the end consumer and retailers to verify the authenticity of the label and of the agricultural asset in which it was applied.

Material security refers to the use of authenticatable security inks, that allows the end consumer and retailers to verify the authenticity of the label when those are visible; and, when invisible, to the service and, for instance, to related authorities (such as the Ministry of Agriculture, Livestock and Supply of Brazil—MAPA).

In general, the material security comprises visible security ink, invisible security ink, the graphic security itself, forensic markers, micro cuts and a highly resistant substrate.

Each identification element or label of the system and method according to the invention comprises several levels of security, as will be described in detail below.

After creation of the identification elements, the service provider performs the grouping of identification elements in batches or rolls, packaged in the quantity requested and, subsequently, promoting the sending of identification elements by the service provider to the requesting intermediary, within a specific period not exceeding a predetermined time-limit. Each roll will also receive a code, a unique identification. This identification shall be used for logistical purposes. The system and method according to the invention ensure that the rolls are sent solely and exclusively to the requesting intermediary, wherein the sending is accompanied by sending documents, indicating the list of rolls being delivered, when, then, the acknowledgment of receipt of the identification elements by the requesting intermediary is performed with the subsequent updating of the platform of the remote server.

Then, the intermediary applies the identification elements to the packaging of agricultural assets and proceeds to digital activation of the identification element through the association, via the remote server, of the unique secure code of the identification element to an origin data of the agricultural asset. Preferably, digital activation of the identification element is performed through the association, via the remote server, of each single serial number and initial and final barcode, to the origin data of the agricultural asset to be identified. Such origin data includes, but is not limited to, the registration or identification data of the provider and/or the intermediary and/or the final consumer, data of the request of the labels, indication of the type of agricultural asset, indication of any additional characteristics of the agricultural asset (e.g., whether the seed is coated or uncoated etc.), physical characteristics and dimensions of the packaging, the weight of the packages, batch number, a term of conformity and other appropriate and related information.

The platform of the remote server calculates the quantity of labels to be activated based on the interval between the codes informed, as well as the quantity in kilograms or unities or multiples of unities involved based on the activation information.

Finally, the intermediary can, eventually, perform the aggregation of packages in multiples of packages, updating this data in the platform and generating an additional identification element of aggregation correlating the unique serial numbers and initial and final barcodes that will compose each multiple of packages, linking this information to the target data of the agricultural asset to be identified.

By way of example, in the case of seed sacks, the platform of the remote server will allow the printing of a label for identification of a pallet (a set of sacks), in which this pallet label will contain a unique serial number, cultivar information, initial and final packet security labels that define the aggregation interval and the previously defined target.

Through the platform of the remote server, the intermediary will also be able to aggregate sacks for export. Applied to the above example, sacks weighing less than 5 kg should be identified with export labels, while the outer sack will receive the standard label. The intermediary will inform the serial number present on the labels applied to the outer sack and the serial number interval (initial and final labels) of the labels of the sacks contained in the external sack. In this way it will be possible to know which sacks weighing less than 5 kg are contained in external aggregate sacks.

Once this has been done, the agricultural assets provided with the identification elements duly activated and valid are delivered to final consumers, who, like any interested third party, can verify through the application in a mobile device the unique identity (single code) compliance of the label with the information contained in the platform database.

If the final consumer is confronted, for example, with a sack having a security label lacking digital activation, it will be declared as possibly false in the verification and the associated information will not be displayed, wherein both the intermediary and the provider will be alerted immediately. Inactivated labels will not be recognized and, therefore, will be blocked.

Element for Secure Identification of Agricultural Assets

An element for secure identification according to the present invention is an element provided with at least one of three distinct types of security, notably digital security, graphic security and material security.

Each identification element or label of the system and method according to the invention is provided with various levels of security, comprising at least eight different security elements, namely:
1. Security element printed with optically variable visible safety paint (Colour Shifting), with variation of colour, for example, dependent on the angle of observation—intended for the intermediary and the final consumer and controllable/verifiable to the naked eye;
2. Tactile security element printed in relief—intended for the intermediary and the final consumer and is controllable/verifiable by tactile sense;
3. Semi-visible security element by light polarization—intended for the intermediary, the service provider and the regulatory/controller body and is controllable/verifiable by means of specific polarization devices;
4. Semi-visible security element printed in microtext—intended for the service provider and the regulatory/controller body and is controllable/verifiable by means of optical magnifying devices, for example a magnifying lens;
5. Hidden security element—intended for the service provider and the regulatory/controller body and controllable/verifiable by means of specific reading devices;
6. Forensic security element—intended for the service provider and the regulatory/controller body and controllable/verifiable by means of specific laboratory analysis;
7. Two-dimensional code, serial code and barcode—intended for the intermediary, the final consumer, the service provider and the regulatory/controller body and controllable/verifiable by means of mobile devices, for example by reading the QR Code, validation of encryption, followed by query to show the trace data, in which the query can be made by the HRC, if there is damage of the QR Code, wherein the barcode will be used to facilitate the logistics of the final consumers; and
8. Relationship between the codes—intended for the intermediary, the final consumer, the service provider and the regulatory/controller body and controllable/verifiable by means of mobile devices, for example, specific correlation between the three different codes, this correlation being registered in the platform database of the secure server.

Computer Programs

A computer program according to the present invention is a computer program associated with one or more mobile devices for at least partial execution of a method according to the invention. Besides, a computer readable medium is provided, the computer readable medium comprising instructions to cause the mobile device to at least partially execute the method according to the invention.

Another computer program according to the present invention is a computer program associated with a remote server for at least partial execution of a method according to the invention. Besides, a computer readable medium is provided, the computer readable medium comprising instructions to cause the remote server to at least partially execute the method according to the invention.

Advantages and Additional Descriptions

The system, method, identification element and computer programs according to the present invention enable tracing of agricultural assets provided with the identification element.

The solution proposed here uses one or more independent and proprietary servers that can be hosted in a cloud.

Another important difference in relation to the prior art is the possibility of transforming any mobile device into an element capable of detecting and receiving information of the identification element, the mobile device connected to a geolocated WiFi network, for example, by Google Street View, being enough and also making it possible to determine the approximate position of the agricultural asset, even without 3G/4G network availability and/or GPS signal.

Moreover, with the solution according to the invention, it is possible to differentiate agricultural assets such as seeds produced following the regulations and marketed by providers and intermediaries, by means of a printed security label, personalized on request and distributed by the service provider.

The labels will be applied to the packaging by the intermediaries, allowing end consumers to differentiate the legitimate seeds from the pirated seeds. Such tags have eight security features, some of which are visible to the naked eye, and a unique traceable code, which can be used throughout the agricultural assets chain. In particular, the identification element will be provided with at least one of three distinct types of security, comprising digital security, graphic security and material security distributed in at least eight different security elements providing a multi-level overt and covert security, which completely excludes a possibility of falsification of the identification element and, at the same time, allows authentication thereof without using costly equipment.

The application for mobile devices like smartphones, public and free, will be available to the participants of the agricultural assets chain. With it, the intermediary and mainly the final consumer can verify the origin of the packages and of the seeds contained, having the guarantee of dealing with quality products, certified in their origin.

The present invention, therefore, provides a system, method, element of identification and computer programs which, together with the aforementioned dimensions and characteristics, enhances the solutions to problems of the state of the art of tracing of agricultural assets in a novel and inventive manner.

It will be readily understood by those skilled in the art that modifications may be made in the present invention without departing from the concepts set forth in the foregoing description. Such modifications should be understood as falling within the scope of the present invention. Accordingly, the particular embodiments described in detail above are only illustrative and exemplary and are not limiting in scope of the present invention, to which the full extent of the appended claims and any and all equivalents thereof shall be granted.

The invention claimed is:

1. A system of identification and authentication for tracing agricultural assets, comprising:
a remote server of a service provider configured to administer agricultural assets chain participants and comprising a processing unit configured to register agricultural assets chain participants data in a database, to create an identification element endowed with a unique secure code linked to an agricultural assets chain participant of the agricultural assets chain participants and to send the identification element to the requesting agricultural assets chain participant, and the remote server is configured to enable a subsequent digital activation of the identification element by the agricultural assets chain participant through an association, via the remote server, of the unique secure code of the identification element to an origin data of the agricultural asset; and
one or more mobile devices configured to read the identification element applied by the requesting agricultural assets chain participant to the agricultural assets or to the packaging of the agricultural assets and digitally activated by the requesting agricultural assets chain participant, and to verify an authenticity of the agricultural assets by checking the unique secure code compliance with an information contained in the database of the remote server;
wherein the agricultural assets chain participants comprise a provider of the assets, a final user or consumer of the assets, and one or more intermediaries or retailers between the provider and the final user or consumer,
wherein the identification element is provided with security elements comprising:
security element printed with optically variable visible safety paint;
tactile security element printed in relief;
semi-visible security element by light polarization;
semi-visible security element printed in microtext;
hidden security element;
forensic security element;
a two-dimensional code, a serial code and a barcode; and
a specific numerical relationship between the two-dimensional code, the serial code and the barcode.

2. The system, according to claim 1, wherein the identification element is an element physically associated with the agricultural asset and capable of receiving identification and authentication markings.

3. The system according to claim 2, wherein the barcode is a one-dimensional barcode.

4. The system according to claim 1, wherein the remote server is configured to create the identification element for individual or collective package that is capable of containing the agricultural asset or a plurality thereof and is capable of receiving the identification element associated with it in a visible and easily accessible place.

5. The system according to claim 1, further comprising at least one of a graphic marking device, a material marking device and a digital marking device for identification element.

6. A method of identification and authentication for tracing agricultural assets, implemented by means of a system of identification and authentication for tracing agricultural assets, comprising:
a remote server of a service provider configured to administer agricultural assets chain participants and comprising a processing unit configured to register agricultural assets chain participants data in a database, to create an identification element endowed with a unique secure code linked to an agricultural assets chain participant of the agricultural assets chain participants and to send the identification element to the requesting agricultural assets chain participant, and the remote server is configured to enable a subsequent digital activation of the identification element by the agricultural assets chain participant through an association, via the remote server, of the unique secure code of the identification element to an origin data of the agricultural asset; and
one or more mobile devices configured to read the identification element applied by the requesting agricultural assets chain participant to the agricultural assets or to the packaging of the agricultural assets and digitally activated by the requesting agricultural assets chain participant, and to verify an authenticity of the agricultural assets by checking the unique secure code compliance with an information contained in the database of the remote server;
wherein the agricultural assets chain participants comprise a provider of the assets, a final user or consumer of the assets, and one or more intermediaries or retailers between the provider and the final user or consumer;
the method comprising:
registering the agricultural assets chain participants data in the database of the remote server of the service provider;
requesting, by the agricultural assets chain participant, the identification element from the service provider;
codificating, personalizing and creating, by the service provider, the identification element endowed with the unique secure code linked to the agricultural assets chain participant;
sending, by the service provider, the identification element to the agricultural assets chain participant;
applying the identification element, by the agricultural assets chain participant, to the agricultural assets or to the packaging of the agricultural assets;
performing the digital activation of the identification element by the agricultural assets chain participant through the association, via the remote server, of the unique secure code of the identification element to the origin data of the agricultural asset; and
reading the identification element and verifying an authenticity of the agricultural assets by checking the unique code compliance with the information contained in the database of the remote server,
wherein the identification element is provided with security elements comprising:
security element printed with optically variable visible safety paint;
tactile security element printed in relief;
semi-visible security element by light polarization;
semi-visible security element printed in microtext;
hidden security element;
forensic security element;
a two-dimensional code, a serial code and a barcode; and a specific numerical relationship between the two-dimensional code, the serial code and the barcode.

7. The method according to claim 6, wherein the barcode is a one-dimensional barcode.

8. The method according to claim 6, wherein the identification elements are grouped in batches or rolls, being sent by the service provider to the requesting agricultural assets chain participant within a specific period not exceeding a predetermined time-limit.

9. A computer readable medium comprising instructions to execute a method of claim 6.

* * * * *